(12) United States Patent
Montalban

(10) Patent No.: US 10,054,801 B2
(45) Date of Patent: Aug. 21, 2018

(54) PROCESS FOR MOUNTING AN ELASTIC HINGE

(71) Applicant: VISOTTICA INDUSTRIE S.p.A., Susegana (IT)

(72) Inventor: Rinaldo Montalban, Venice (IT)

(73) Assignee: VISOTTICA INDUSTRIE S.P.A., Susegana (IT)

( * ) Notice: Subject to any disclaimer, the term of this patent is extended or adjusted under 35 U.S.C. 154(b) by 155 days.

(21) Appl. No.: 15/189,002

(22) Filed: Jun. 22, 2016

(65) Prior Publication Data

US 2016/0377883 A1 Dec. 29, 2016

(30) Foreign Application Priority Data

Jun. 26, 2015 (IT) ................. 102015282258

(51) Int. Cl.
    *G02C 5/16* (2006.01)
    *G02C 5/14* (2006.01)
    *G02C 5/22* (2006.01)
    *G02C 13/00* (2006.01)

(52) U.S. Cl.
    CPC ............ *G02C 5/22* (2013.01); *G02C 5/2236* (2013.01); *G02C 5/2281* (2013.01); *G02C 13/001* (2013.01); *G02C 5/2209* (2013.01); *G02C 5/2245* (2013.01); *G02C 2200/26* (2013.01)

(58) Field of Classification Search
    CPC .. G02C 5/2209; G02C 5/2218; G02C 5/2227; G02C 5/2236; G02C 5/2245; G02C 5/2254
    USPC ......... 351/111, 113, 116, 121, 141, 153, 178
    See application file for complete search history.

(56) References Cited

U.S. PATENT DOCUMENTS

| 3,941,461 A * | 3/1976 | Lambert ................. G02C 1/08 351/121 |
| 4,145,124 A | 3/1979 | Weisgerber |
| 4,818,093 A * | 4/1989 | Tabacchi ............. G02C 5/2245 16/228 |
| 6,631,194 B2 * | 10/2003 | Fukuoka ............. G02C 5/2245 351/153 |
| 8,128,219 B2 * | 3/2012 | Montagner .......... G02C 5/2236 16/228 |
| 8,684,518 B2 * | 4/2014 | Gasparetto ............... G02C 5/22 16/228 |

(Continued)

FOREIGN PATENT DOCUMENTS

DE   102007048011 A1   4/2009
EP       0345145 A1   12/1989

(Continued)

OTHER PUBLICATIONS

English machine translation of WO 9826325 A1.*

*Primary Examiner* — Nicholas R Pasko

(74) *Attorney, Agent, or Firm* — Mark M. Friedman

(57) ABSTRACT

Process for mounting an elastic hinge on an eyeglass frame, which provides for fixing a first pivot element to a first component of an eyeglass frame, for fixing a second pivot element to a second component of the eyeglass frame, and for engaging a hinge pin within first holes of the first pivot element and within second holes of the second pivot element, wherein a thinned portion of the hinge pin interferes with two head portions of the first pivot element in order to align the first holes of the first pivot element with the second holes of the second pivot element.

15 Claims, 14 Drawing Sheets

(56) References Cited

U.S. PATENT DOCUMENTS

2012/0002160 A1* 1/2012 Blum .................... G02C 7/081
                                                              351/121

FOREIGN PATENT DOCUMENTS

| FR | 2658570 A1 | 8/1991 | | |
| IT | UD20070224 A1 | 5/2009 | | |
| JP | 2003336622 A | 11/2003 | | |
| WO | 98/26325 A1 | 6/1998 | | |
| WO | WO 9826325 A1 * | 6/1998 | ........... | G02C 5/2281 |
| WO | 2004040355 A1 | 5/2004 | | |
| WO | 2006053983 A1 | 5/2006 | | |
| WO | 2012/035382 A1 | 3/2012 | | |

* cited by examiner

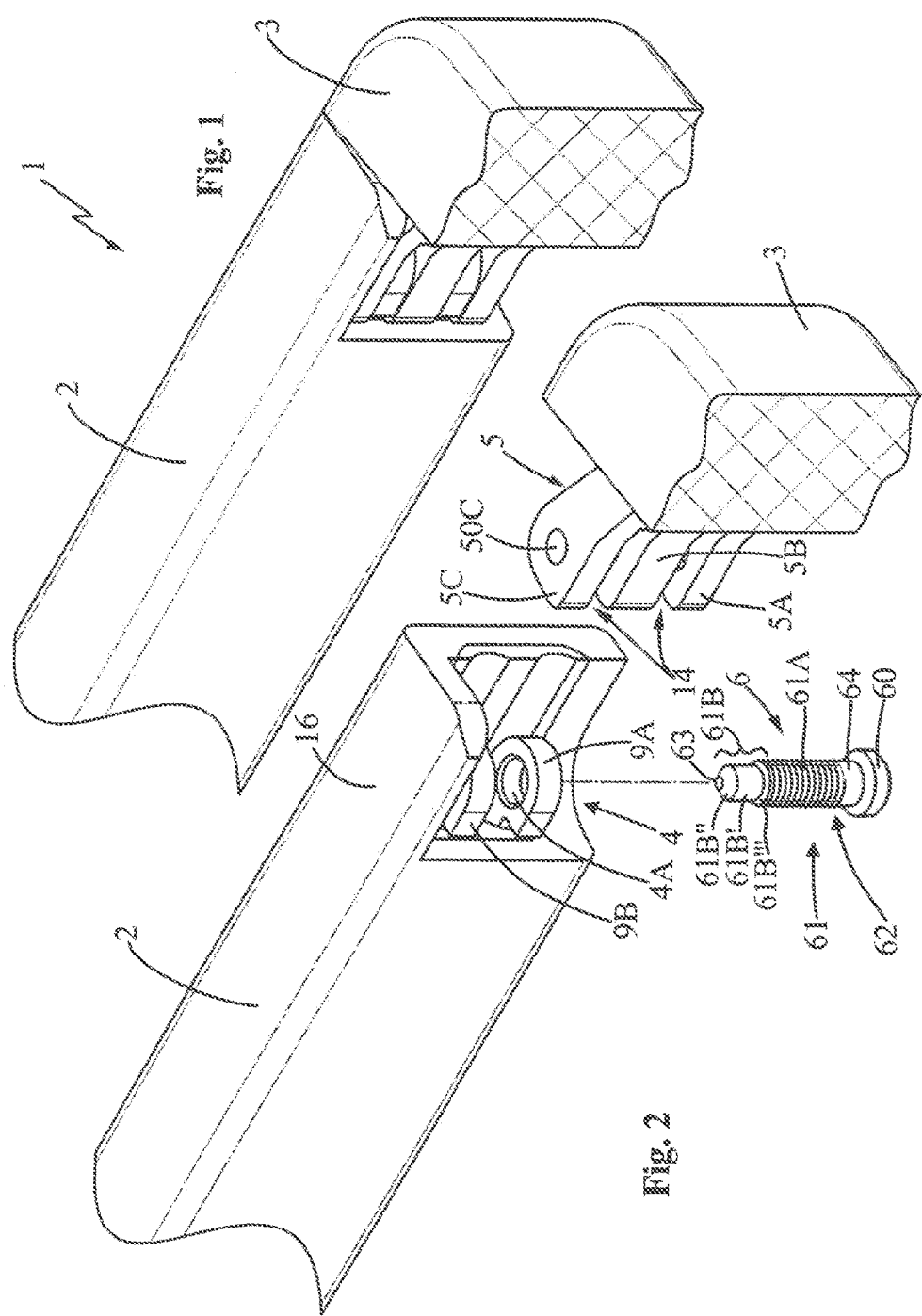

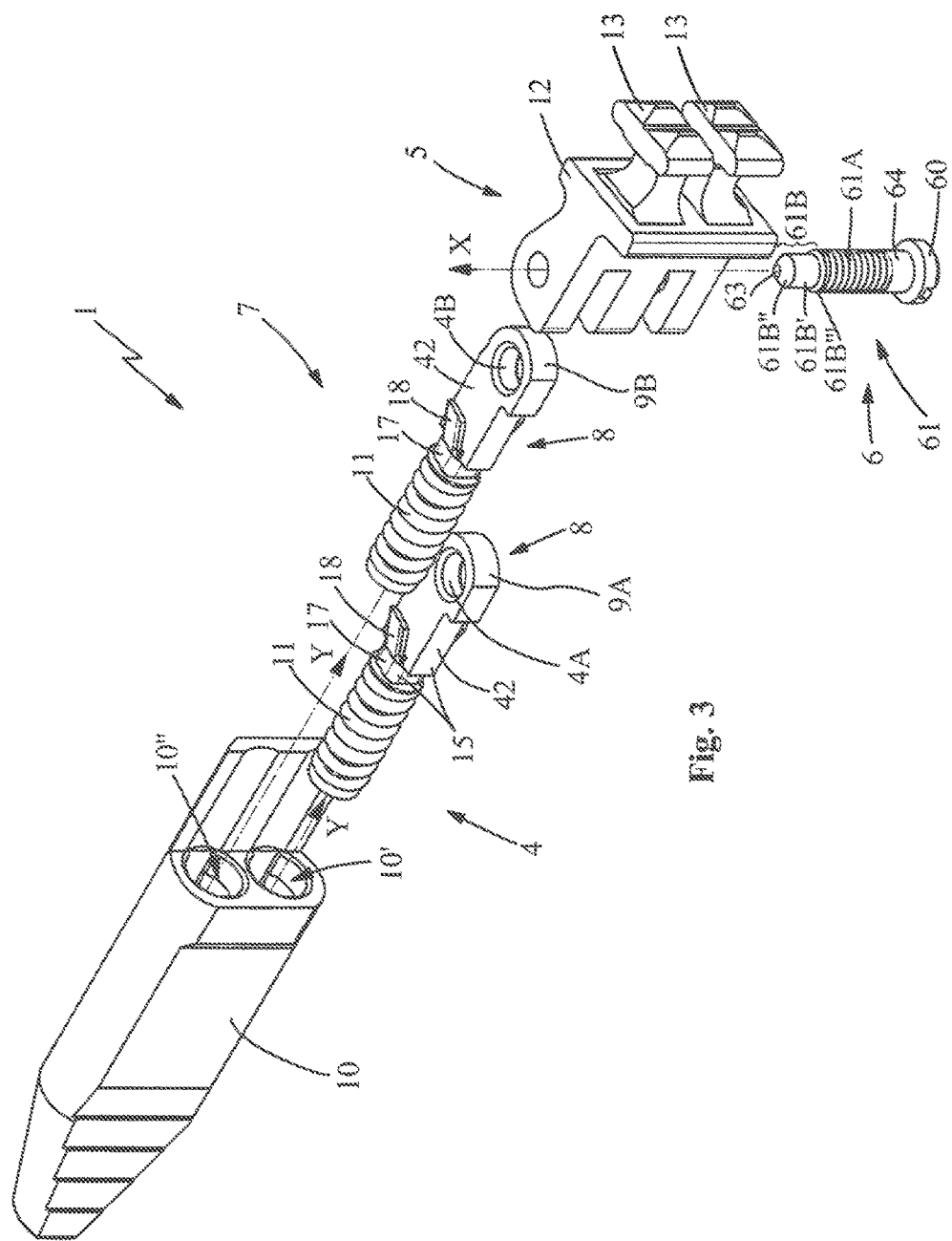

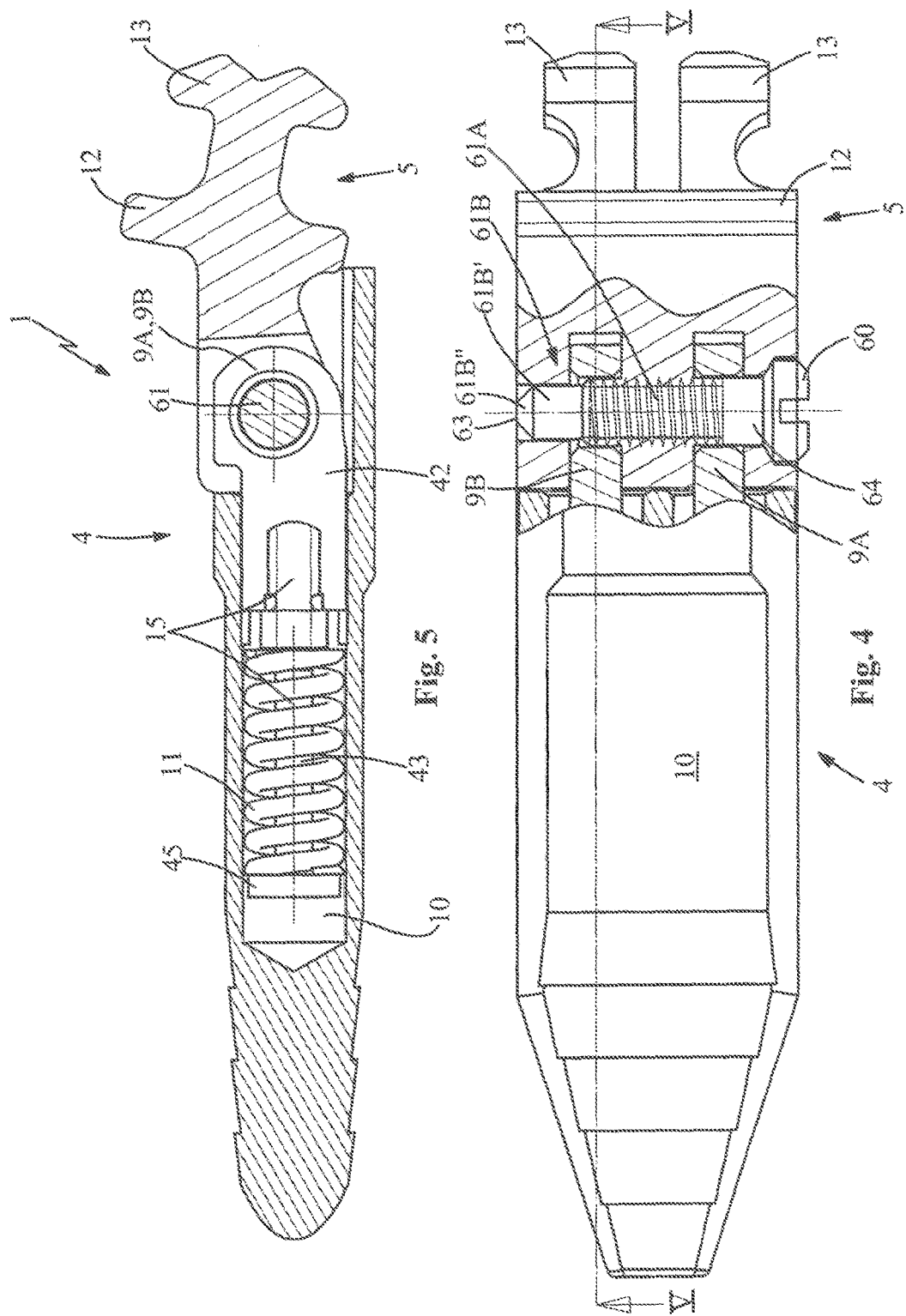

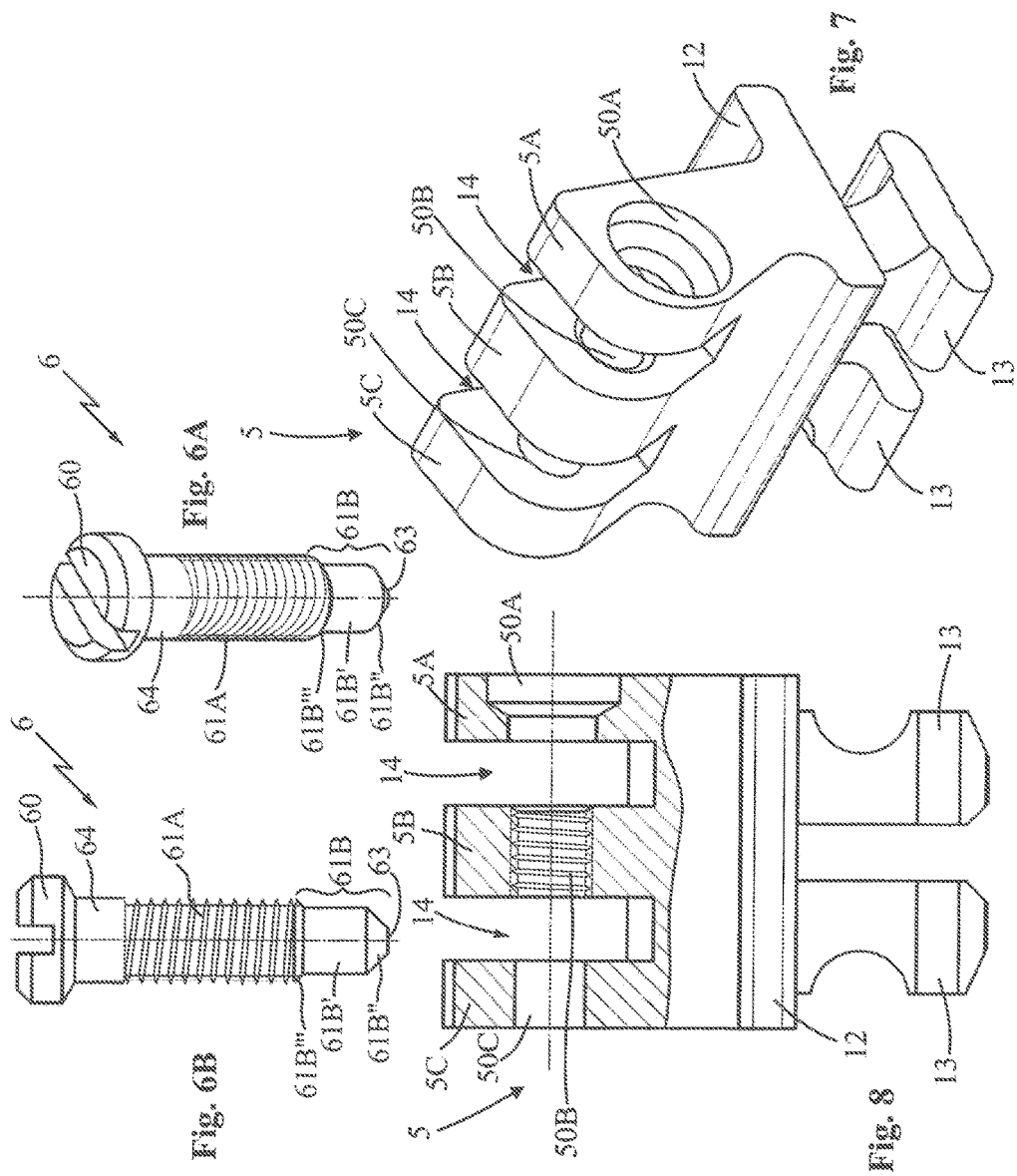

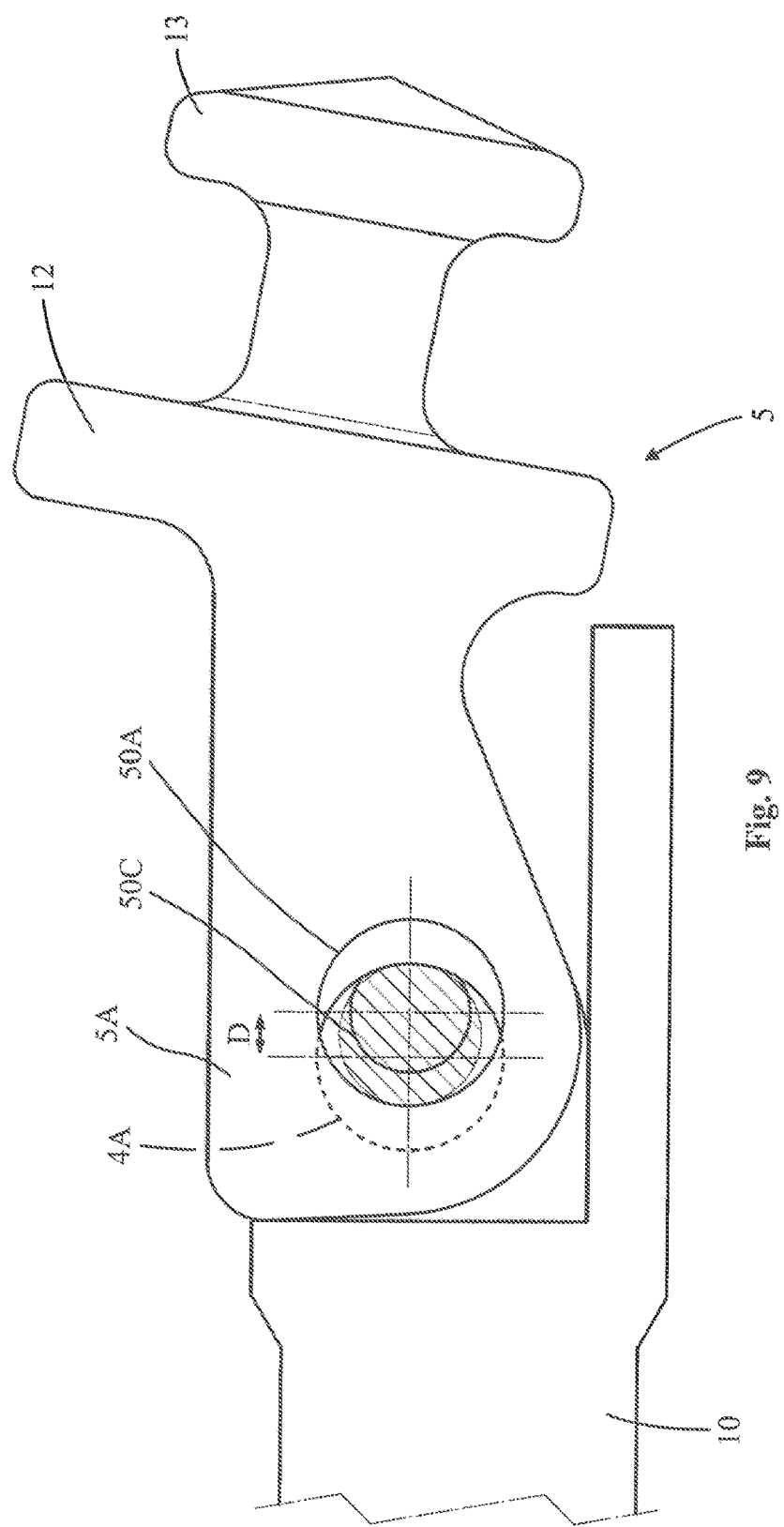

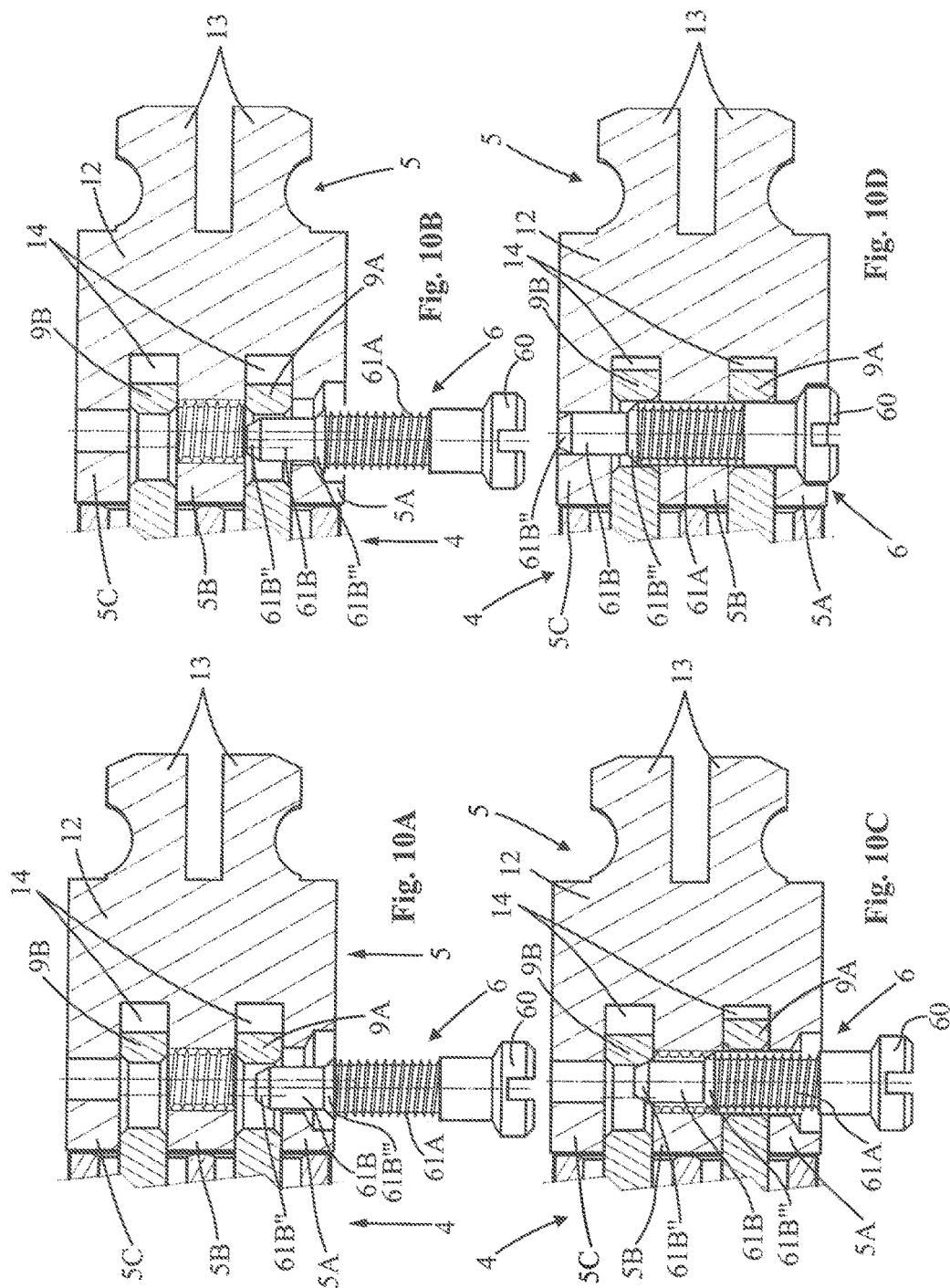

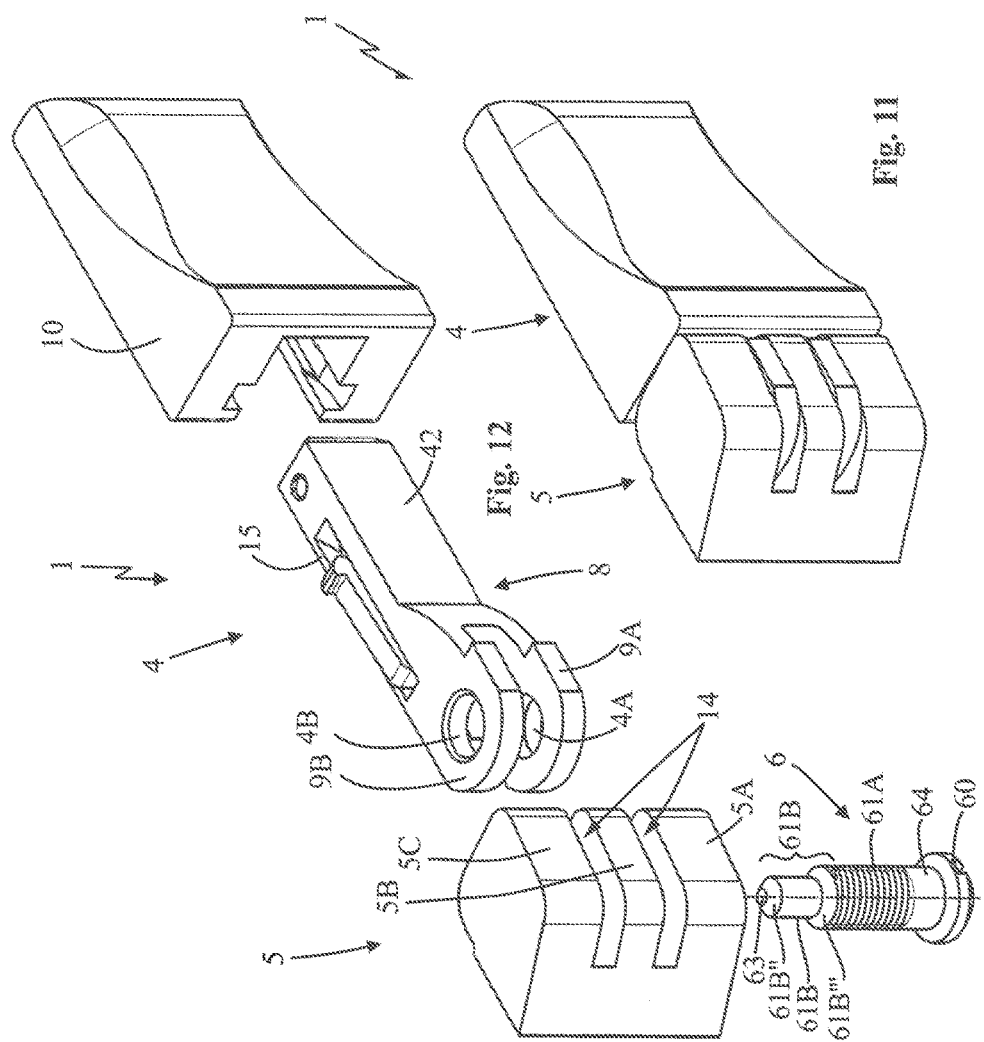

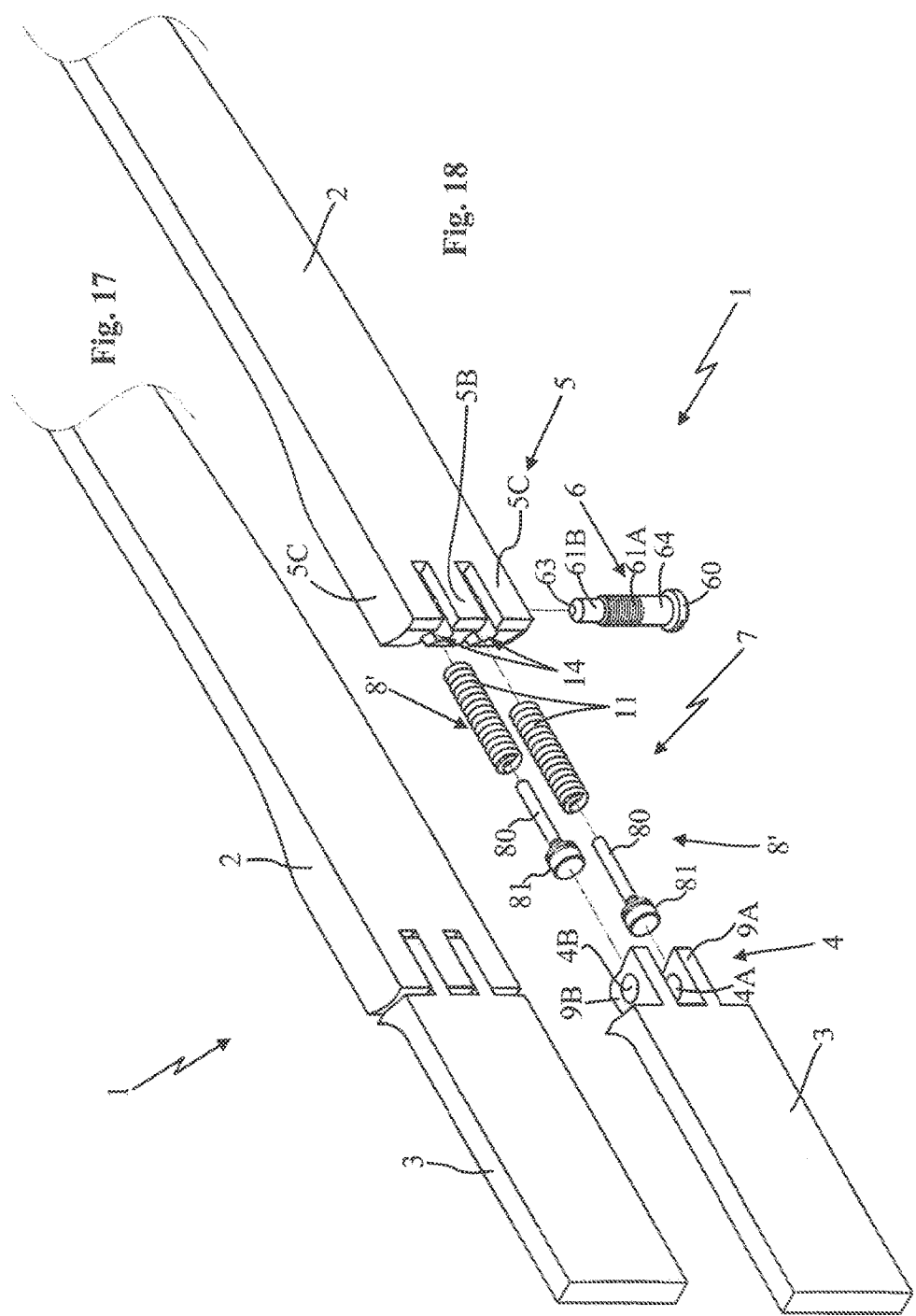

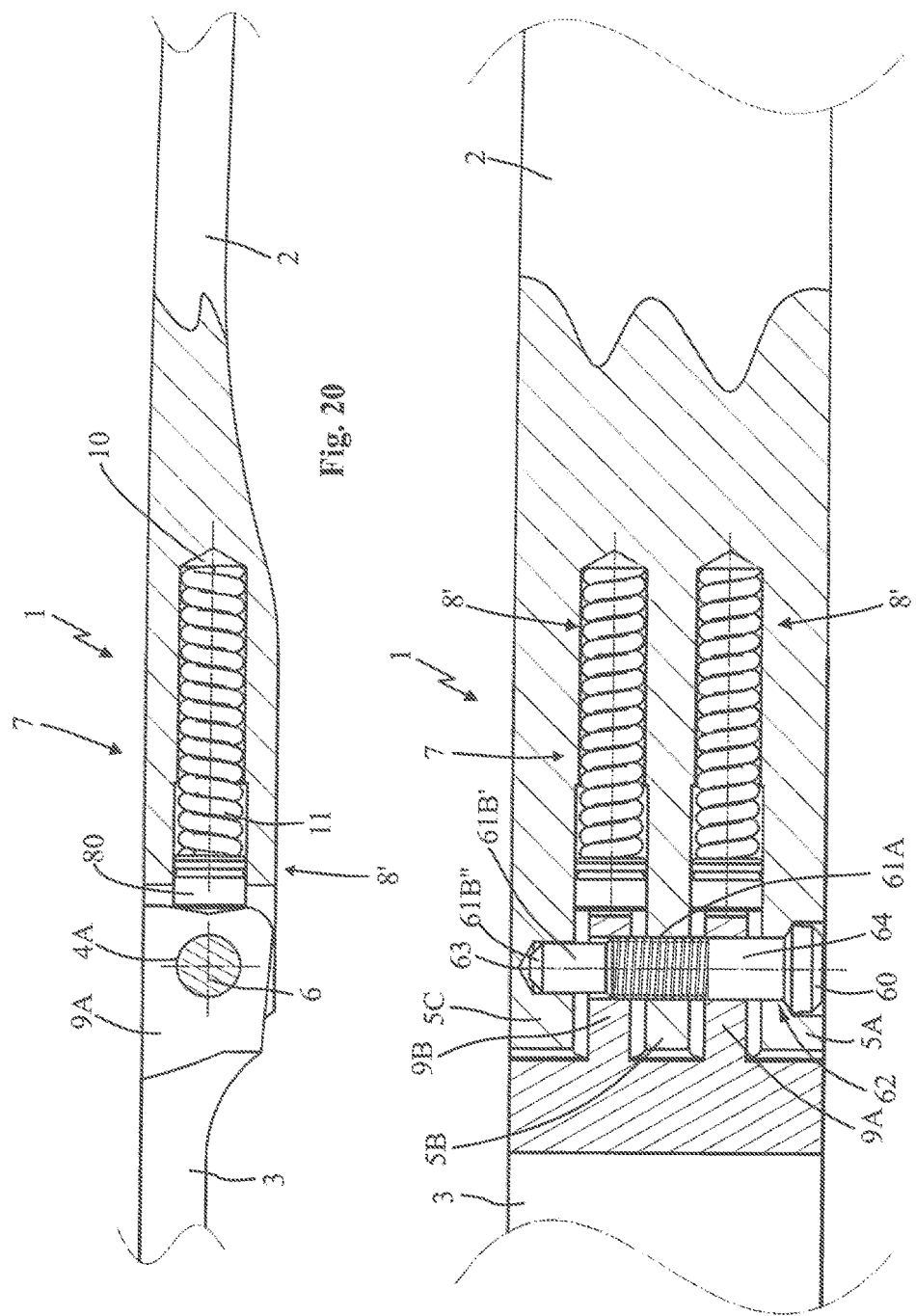

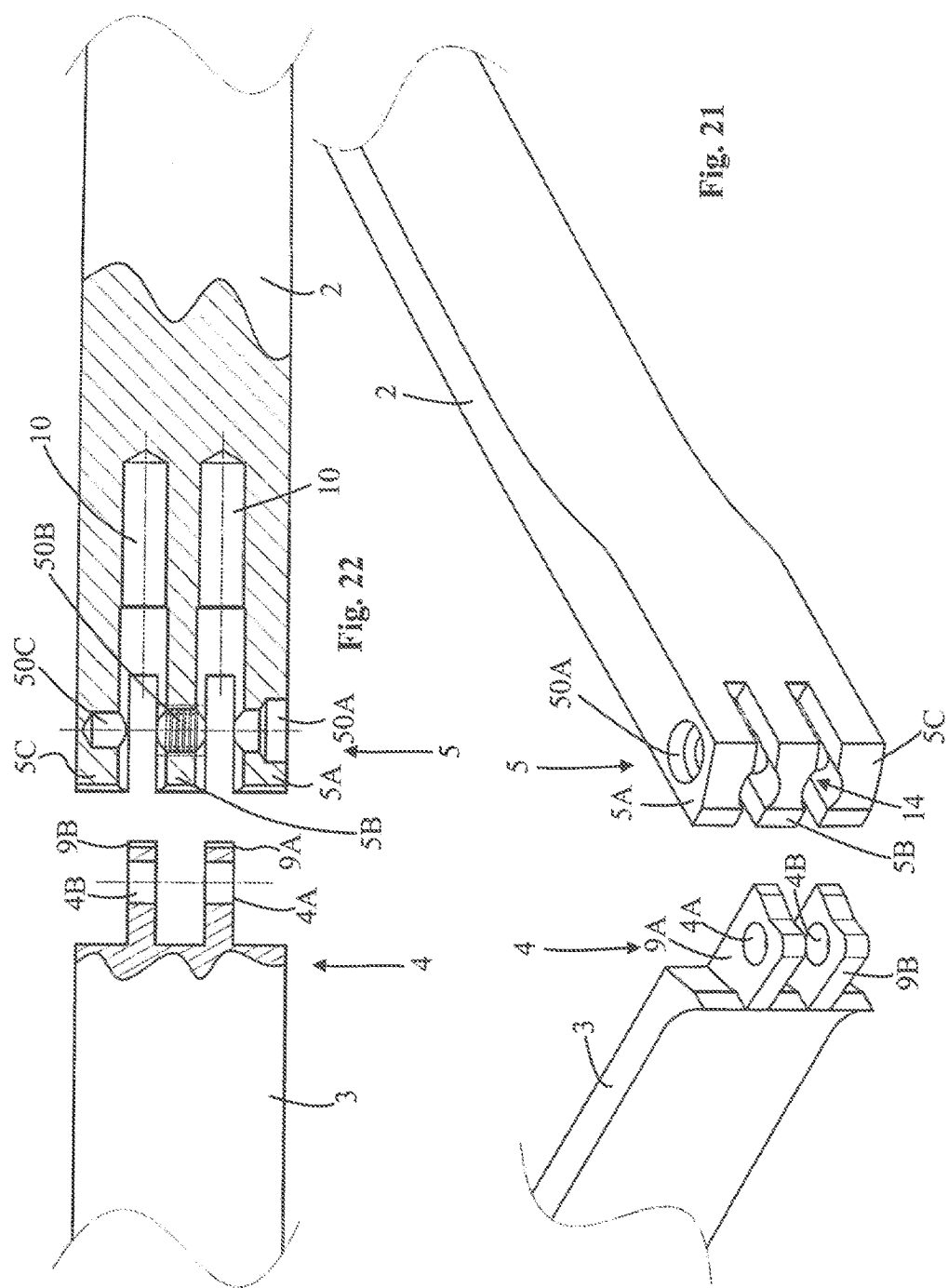

PROCESS FOR MOUNTING AN ELASTIC HINGE

FIELD OF APPLICATION

The present invention regards a process for mounting an elastic hinge on eyeglass frames.

The present process is intended to be advantageously employed in the production of eyeglass frames, made of plastic or metal, in particular of the type adapted to limit, as much as possible the visible presence of unaesthetic components of the hinge.

Therefore, the process for mounting a hinge, object of the present invention, is inserted in the industrial field of eyeglasses or production of eyeglasses and accessories and components for eyeglasses.

STATE OF THE ART

Conventionally, in the field of eyeglasses, hinges are employed in order to join the temples to the front of a frame.

Each hinge is usually formed by two pivot elements, pivoted to each other, of which, respectively, a first element is fixed to a temple and a second element is fixed to a lateral portion of the front of the frame (also known, in the technical jargon of the field, with the term "end piece").

In operation, the hinges allow the temples to rotate between a closed position, in which they are collected on the front of the eyeglasses, and an open position, in which they assume a substantially right-angle position with respect to the front adapted to allow the use thereof on the face of the user.

In particular, the present invention refers to so-called "elastic" hinges, i.e. to hinges that allow moving the temples between the aforesaid positions by overcoming a contrast three exerted by an elastic device associated with the hinge.

The elastic device allows numerous advantages, including that of allowing the user to more easily put on the eyeglasses, since the temples can be moved for an extra-travel beyond the aforesaid open position in order to then be released, once the eyeglasses are put on, on the head of the user thus exerting a light pressure thereon. Such pressure allows the temples to always be maintained adherent to the head of the user, ensuring an optimal stability of the eyeglasses in the different use conditions.

The elastic device also allows maintaining the temples collected behind the front in a stable closure condition.

The elastic device usually comprises one or more elastic mechanisms, which are associated with corresponding first pivot elements, and are housed within corresponding elongated containment structures, fixed to the temple along their longitudinal extension axis. Each mechanism is susceptible to slide along the longitudinal axis of the containment structure and is elastically returned towards the interior of the containment structure by a spring.

These elastic mechanisms can be in the form of flex carts or simpler concepts such as the so-called "piston-spring" mechanisms.

The containment structures are made directly on the temple or made on a box-like body borne thereon. The first pivot elements associated with the elastic mechanisms are pivoted by means of a hinge screw to the second pivot elements fixed to the end piece. For such purpose, the screw is engaged in aligned holes of the two pivot elements.

In order to exert this suitable pressure on the temples of the user, it is necessary for the spring of the elastic device to be suitably pre-compressed already during cart assembly. In addition, it is almost always necessary for the spring of the elastic device to be further subjected to an additional preloading that is provided by giving a certain misalignment between the holes of the two pivot elements.

This misalignment between the holes of the first pivot element associated with the elastic mechanism, and the holes of the second pivot element associated with the end piece, is recovered in the assembly step during the mounting of the hinge screw. Indeed, with the insertion of the screw, the elastic mechanism is forced for a section which allows aligning the holes of the two pivot elements with each other, actually obtaining the further preloading of the elastic device.

An example of an elastic hinge of known type is described in the patent application WO 2012/035382.

In practice, the elastic hinges of known type have demonstrated the drawback of requiring a process of assembly of the two pivot elements that is rather problematic, due in fact to the aforesaid misalignment of the holes between the two pivot elements which can be complex to recover for the insertion of the screw, since it requires that the optician or the automatic machines, in case of automated screwing, achieve a complex centering operation before being able to insert the screw. Regardless of the difficulty of the aforesaid operation, the process in any case involves a centering step that negatively affects the production process or further complicates work of the optician.

This problem is still more significant if there are elastic hinges with pivots having five or more wings, in which there are multiple wings that must be aligned with each other.

In order to overcome this drawback, it is known to use self-centering screws, as described for example in the patent FR-A-2658570. In accordance with such known elastic hinge, the screw comprises, following a threaded stem portion, also a non-threaded extension portion.

This extension portion advantageously has reduced diameter compared to the diameter of the threaded portion and fulfills the object of facilitating the centering of the two pivot elements and consequently the assembly of the elastic hinge. After the screw has been mounted, its extension portion is easily broken or removed, actually reducing the self-centering screw to a conventional screw.

The hinges of known type which employ self-centering screws, as described above, have the disadvantage that once the extension portion of the screw is broken, such portion serving to facilitate the centering of the hinge, the same screw becomes a conventional screw and thus in case of disassembly and subsequent remounting of the hinge there is once again the problem of centering the holes.

A further drawback of these known hinges lies in the fact that the extension portion of the stem of the screw is material that is lost, with a consequent increase of the production costs.

Another drawback of the hinges with self-centering screw lies in the fact that they cannot be applied to frames that provide for concealing the hole of the relative hinge pivot placed at the end of the stem of the screw.

Indeed, for aesthetic reasons it can be concealed by an extension portion of the temple or it can be concealed by attaining the hole blind, such that the latter tab of the pivot appears externally clean without interruption.

In both cases, it is not possible to use this type of self-centering screws since the extension portion could not project from the hole.

More in detail, presently it is sought to obtain aesthetics as "clean" as possible on the frames; consequently, visible components such as hinges, or parts thereof such as screws or holes are increasingly considered unaesthetic elements for the line of the eyeglasses.

It is therefore sought to reduce this problem by integrating these elements inside the eyeglass frame or in any case by seeking to hide them from sight.

As already partly mentioned above, it is known to remedy these aesthetic problems by means of the use of hinges which provide for covering the upper tab of the pivot where the hole of the screw leads to with a portion of the temple, as for example described in the patent WO-A-2006053983.

Otherwise, some hinges diffused on the market provide for making such hole (usually of the second female pivot fixed to the end piece) of non-through but blind type, so as to obtain the hidden screw effect.

Otherwise, furthermore, the screw and its hole can be hidden by suitable projecting walls of the containment structure, as described for example in the patent WO-A-2004040355.

Nevertheless, of course, the aforesaid hinge solutions which do not make use of self-centering screws have the abovementioned problem relative to the insertion of the screw, due to the fact that with such operation it is also necessary to attain a further loading of the elastic device.

In order to overcome the screw mounting difficulties and simultaneously meet the aforesaid aesthetic needs, the patent IT-A-UD2007000224 provides for connecting the two pivots with a screw, the cart being disengaged from the temple, and then only at a later time inserting the cart in the containment structure with the desired loading of the elastic device by employing a second screw fur locking the cart in the desired load position of the spring. The second screw is however a third element, with respect to the frame, which remains visible and which is necessary for locking the carts with the desired preload.

Therefore, the current elastic hinges present on the market have the drawback of not simultaneously meeting the aesthetic needs of concealing the components of the hinge and the function needs of tightening the spring of the elastic device during the coupling of the pivots with the right load that allows a return of the temples with the correct pressure on the user's head.

The Japanese patent JP 2003336622 describes a hinge of known type which is not elastic, since such hinge is not provided with any elastic device associated with the pivot elements of the hinge itself.

More in detail, the hinge described in the patent JP 2003336622 comprises a first female pivot element integrally fixed to the front of the eyeglasses, and a second male pivot element integrally fixed to a temple of the eyeglasses and hinged to the first female pivot element by means of a pivoting screw.

In particular, the first female pivot element is provided with only two shoulders which delimit therebetween a slit, and the second male pivot element is provided with only one head portion inserted in the slit of the first female pivot element.

In addition, the pivoting screw of the hinge is provided with a thread portion which is engaged via screwing in a threaded hole of the head portion of the second male pivot element, in a manner such to make the latter integral with the pivoting screw itself in order to avoid the formation of loosening which can give rise to clearances between the pivot elements.

The Japanese patent JP 2003336622, regarding in particular an unaesthetic hinge, does not at all confront the abovementioned technical problem of remedying the misalignment between the holes of the two pivot elements of an elastic hinge.

PRESENTATION OF THE INVENTION

In this situation, the problem underlying the present invention is to eliminate the drawbacks of the abovementioned prior art, by providing a process for mounting a hinge for eyeglass frames which is quick and easy to achieve.

A further object of the present finding is to provide a process for mounting a hinge for eyeglass frames which can be executed in a simple manner, even following disassembly of the hinge after its assembly during eyeglass production, e.g. by an optician or the same user.

A further object of the present finding is to provide a process for mounting a hinge for eyeglass frames which is inexpensive to achieve.

A further object of the present finding is to provide a process for mounting a hinge for eyeglass frames which allows obtaining elastic hinges that have entirely satisfactory aesthetics.

A further object of the present finding is to provide a process for mounting a hinge for eyeglass frames which allows concealing from view the hole of the hinge pivots for the screw insertion.

A further object of the present finding is to provide a process for mounting a hinge for eyeglass frames which allows obtaining hinges that are entirely reliable in operation.

BRIEF DESCRIPTION OF THE DRAWINGS

The technical characteristics of the finding, according to the aforesaid objects, are clearly seen in the contents of the below-reported claims and the advantages thereof will be more evident from the following detailed description, made with reference to the enclosed drawings, which represent several merely exemplifying and non-limiting embodiments of the invention, in which:

FIG. 1 shows in a perspective view an elastic hinge for eyeglass frames mounted to connect a temple and an end piece of the eyeglass frame, with the temple and the end piece only partly illustrated and with the temple in open position;

FIG. 2 shows the hinge of FIG. 1 with the temple and the frame separated, the connection pin of the two pivots of the hinge having been removed;

FIG. 3 shows the hinge of FIG. 1 disassembled from the frame with the components partially exploded;

FIG. 4 shows the hinge of FIG. 3 with the two provided pivots engaged with each other and partially shown in section at the connection pin;

FIG. 5 shows the elastic hinge in a longitudinal section view carried out along the line V-V of FIG. 4;

FIGS. 6A and 6B respectively show, in a perspective and side view, a detail of the elastic hinge relative to the connection pin of the pivots;

FIG. 7 shows a perspective view of a detail of the elastic hinge relative to the second female pivot;

FIG. 8 shows the detail of FIG. 7 in a side and partially sectioned view at the passage hole of the pin;

FIG. 9 shows a top schematic section of a portion of the elastic hinge, with hatched lines indicating the hole of the first male pivot connected to the temple and with a dashed line indicating the minimum area inscribable in the misalignment between the two holes of the two pivot elements;

FIGS. 10A, 10B, 10C and 10D show the elastic hinge, in a sequence of operations during the pin engagement step;

FIG. 11 shows an elastic hinge for eyeglass frames in accordance with a second embodiment in a perspective view;

FIG. 12 shows the hinge of FIG. 11 with its components in partially exploded view;

FIG. 17 shows an elastic hinge for eyeglass frames in a perspective view, according to a third embodiment, mounted to connect a temple and an end piece of the eyeglass frame, with the temple and the end piece only illustrated in part and with the temple in open position;

FIG. 18 shows the hinge of FIG. 17 with the temple and the frame separated, the connection pin of the two pivots of the hinge having been removed and with the components partially exploded;

FIGS. 19 and 20 show the hinge of FIG. 17 mounted on the eyeglass frame in two section views with respect to two orthogonal planes passing through the extension axis of the temple;

FIG. 21 shows a perspective view of the hinge of FIG. 17 mounted on the eyeglass frame with the pivot elements separated from each other and with some parts removed in order to better illustrate other parts;

FIG. 22 shows a partially sectioned view of the hinge of FIG. 17 mounted on the eyeglass frame with the pivot elements separated from each other and with some parts removed in order to better illustrate other parts;

DETAILED DESCRIPTION OF A PREFERRED EMBODIMENT

Figure 13:
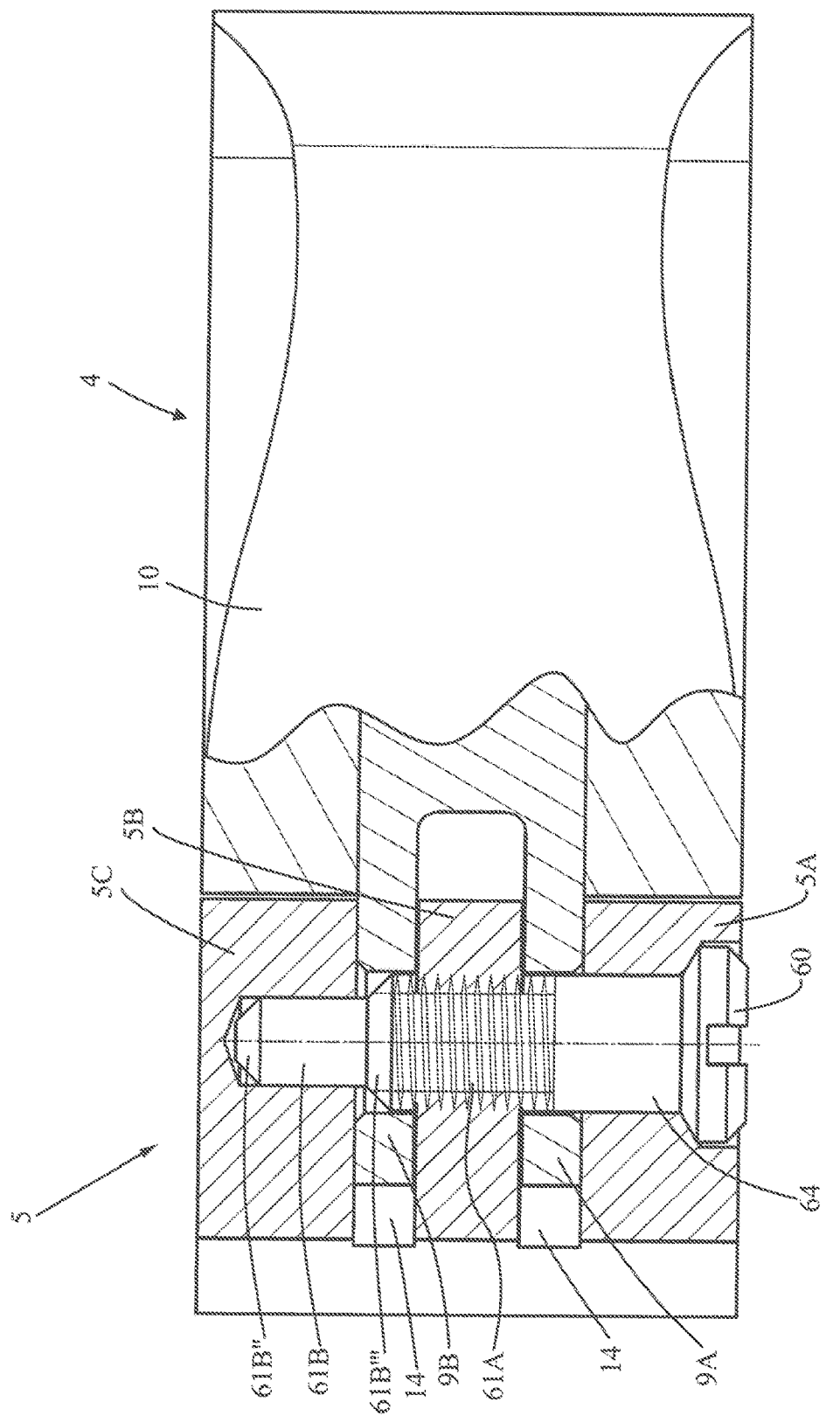
FIG. 13 shows the hinge of FIG. 11 with the two pivots assembled and shown partially in section at the connection pin.
Figure 15:
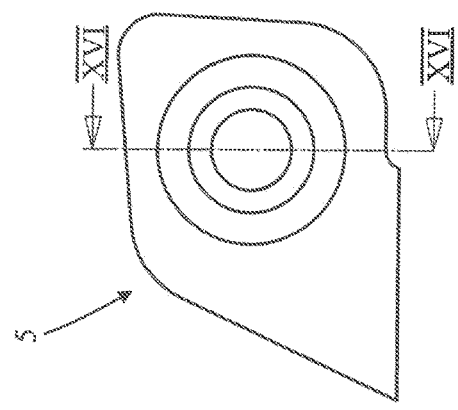
FIG. 15 shows a top view of the female pivot of FIG. 14.
Figure 14:
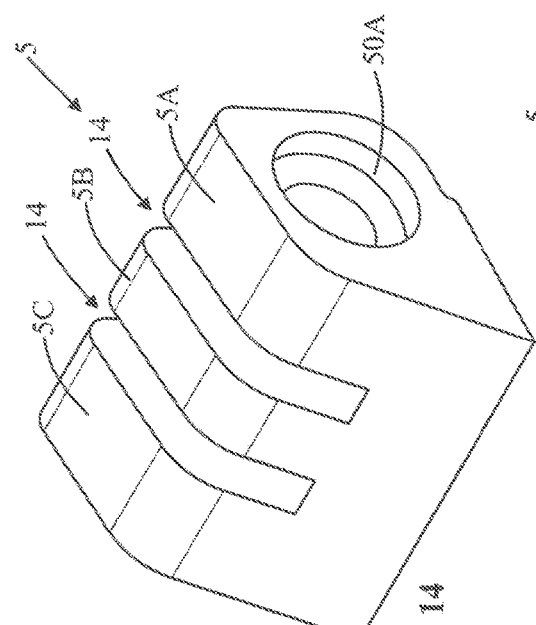
FIG. 14 shows a perspective view of a detail of the hinge of FIG. 11 relative to only the second female pivot.
Figure 16:
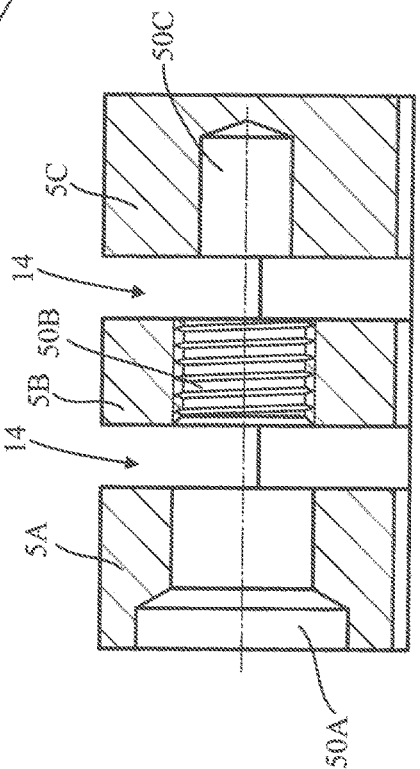
FIG. 16 shows the detail of FIG. 15 in a side, section view at the passage hole of the pin, carried out along the line XVI-XVI of FIG. 15.

With reference to the enclosed drawings, reference number 1 overall indicates an elastic hinge for eyeglass frames.

The elastic hinge 1 is intended for making eyeglass frames of both conventional and sports type and is adapted to mutually join together, in a per se known manner, a temple 2 and an end piece 3 of a frame for eyeglasses.

The latter will be obtained in a manner that is per se entirely conventional and hence for example made of plastic material, such as nylon, or other plastic materials suitable for such purpose, or metal material. The frame will be described hereinbelow only in summary, since its constructive principles are well known to a man skilled in the art.

More in detail, the frame is usually formed, in a per se conventional manner, by a front that supports a pair of lenses, connected in the central part by a bridge, and by a pair of temples 2 pivoted by means of elastic hinges 1 to the sides of the front and, more precisely, to two lateral portions thereof directed towards the rear part of the eyeglasses and known in the technical jargon with the term end pieces 3.

In particular, the hinge 1 is of elasticized type, i.e. adapted to allow an extra-travel in the opening of the temples 2, with elastic return aimed to allow easily putting on the eyeglasses and aimed to ensure an improved fit thereof once put on the head of the user.

In operation, the temples 2 can be moved, due to the aforesaid elastic hinges 1, in a manner that is per se entirely conventional, between a closure position, in which they are collected on the front of the eyeglasses, an open position, in which they assume a substantially right angle position with respect to the front of the eyeglasses, and an extra travel position, in which they are forced beyond the aforesaid open position.

The elastic hinge 1 comprises two pivot elements 4, 5 mechanically associated with each other by means of a hinge pin 6.

More in detail, a first pivot element 4 can be mechanically associated with a first component of the eyeglass frame which is represented by a temple in accordance with the embodiments of FIGS. 1-10 and 11-16, while it is represented by the end piece of the front of the eyeglasses in accordance with the embodiment of FIGS. 17-20.

The first pivot element 4 is the male element of the hinge and is provided with at least two protruding head portions 9A, 9B, provided with two corresponding first aligned holes 4A, 4B.

The second pivot element 5, i.e. the female element of the hinge, is in turn mechanically associable with a second component of the eyeglass frame which is represented by the end piece of the front of the eyeglasses in accordance with the embodiments of FIGS. 1-10 and 11-16, while it is represented by a temple in accordance with the embodiment of FIGS. 17-20.

The second pivot element 5 comprises three shoulders 5A, 5B, 5C provided with corresponding second aligned holes 50A, 50B, 50C.

More in detail, the three shoulders 5A, 5B, 5C comprise a first shoulder 5A, a second shoulder 5B and a third shoulder 5C, each of which provided with a corresponding second hole 50A, 50B, 50C.

The three shoulders 5A, 5B, 5C delimit therebetween two slits 14, in which the head portions 9A, 9B of the first pivot element 4 are inserted.

In particular, the second shoulder 5B of the second pivot element 5 is arranged between the first shoulder 5A and the third shoulder 5C and is advantageously separated from the latter by the aforesaid slits 14.

The first and the second pivot element 4 and S are mutually pivoted to each other by means of a hinge pin 6 inserted in the abovementioned holes with transverse axis X and for example advantageously constituted by a screw.

The hinge 1 then comprises an elongated containment structure 10 along a longitudinal axis Y, mechanically associable with one of the two pivot elements 4, 5, i.e. fixed to one of the components of the eyeglass frame. Advantageously and in accordance with all the embodiments of the enclosed figures, the containment structure 10 is always associated with the temple, also because its elongated shape makes it more suitable for being mounted thereon and therefore it is associated with the first pivot element in accordance with FIGS. 1-10, 11-16 of the first two embodiments and is associated with the second pivot element in accordance with the embodiment of FIGS. 17-20.

Inside the containment structure 10, an elastic device 7 is housed which is slidably movable along the longitudinal axis Y of the same containment structure 10.

The elastic device 7 comprises at least one spring 11 which elastically acts on the head portions 9A, 9B. For such purpose, as will be clarified hereinbelow, in accordance with the embodiments of FIGS. 1-10 and 11-16 the elastic device 7 is associated with the first pivot element 4 and comprises one or more carts 8 on which the head portions 9A, 9B are fixed and on which respective springs 11 act, while in accordance with the embodiment of FIGS. 17-20 the elastic device 7 comprises one or more pistons 80 associated with the second pivot element 5 and on which respective springs 11 act which push the heads of the pistons 80 against the head portions 9A, 9B associated with the first pivot element 4.

In accordance with the embodiments of FIGS. 1-10, and 11-16 the first pivot element 4 comprises a containment structure 10 fixed to the temple 2 and an elastic device 7 slidably movable within the containment structure 10 along a longitudinal axis Y substantially parallel to that of the temple 2.

The containment structure 10 can be obtained with a box-like body fixed to the temple 2, i.e. it can be made inside the temple 2 directly during the manufacturing of same temple 2.

In accordance with such embodiments, the two head portions 9A, 9B are extended at least partially outside the containment structure 10 and are provided with two corresponding first holes 4A, 4B. In addition, the elastic device 7 advantageously comprises one or more carts 8 and for example respectively two separate carts 8, in accordance with the first embodiment of FIGS. 1-10, and only one cart 8, in accordance with the second embodiment of FIGS. 11-16, associated with the abovementioned head portions 9A, 9B.

In the case of the two carts 8 of the first embodiment, the containment structure 10 advantageously provides for two corresponding slide seats 10', 10", each of which slidably housing a corresponding cart 8 therein.

Each spring 11 is aimed to push the corresponding cart 8 towards the interior of the containment structure 10 and for such purpose acts both against the cart 8 and against the containment structure 10.

More in detail, each cart 8 of the first pivot element 4 comprises a male element 15, which is provided with a main longitudinal extension along the slide axis Y parallel to that of the temple 2 and is composed of a neck portion 42 and a rod-like portion 43 and of the aforesaid one or two head portions 9A, 9B.

In the case of the first embodiment (FIGS. 1-10), two separate carts 8 are present and the two head portions 9A, 9B refer to two separate male elements 15, each head portion thus being fixed to a corresponding neck portion 42. Otherwise, in the case of the second embodiment (FIGS. 11-16), there is a single cart 8 and the two head portions 9A, 9B refer to a single male element 15, both thus being fixed to a common neck portion 42 at whose interior the actual elastic element is housed (not visible).

In any case, each head portion 9A, 9B is extended outside the containment structure 10 of the temple 2, and is provided with a corresponding first hole 4A, 4B, intended to be engaged by the pin 6.

The neck portion 42 is extended to the rear from the head portion 9A, 9B along the longitudinal extension axis Y and is shaped with an advantageously prismatic shape, e.g. parallelepiped in order to prevent the rotation of the male element 15 of the cart 8 around its longitudinal extension axis inside the containment structure 10 suitably shaped in its initial guide section with respect to the aforesaid neck portion 42.

The rod-like portion 43 is extended starting from the rear face of the neck portion 42 and has, at the free end, an enlarged head 45 constituted for example by the head of a screw or of a pin or by a riveting of the end of the rod-like portion 43.

The abovementioned spring 11 that aims to push the cart 8 towards the interior of the containment structure 10 is advantageously coaxially wound around the rod-like portion 43 of the male element 15 and abuts with its ends against the enlarged head 45 of the rod-like portion 43 of the male element 10, and against an end stop obtained for example with step or ring or another element internally projecting from the containment structure 10 (e.g. produced by means of punching) in order to interfere with the spring 11, at the neck of the male element 15.

In accordance with the embodiment illustrated in the enclosed FIGS. 1-10, the aforesaid end stop is obtained with a locking element constituted by a ring 17 mounted coaxially around the neck of the male element 15 and provided with two check tabs 18. Once the cart 8 is inserted in the containment structure 10, such check tabs 18 are engaged with the latter, defining with the ring 17 the locking of the cart 8 in the relative seat 10', 10" with the only degree of freedom of sliding along the axis Y.

Still in accordance with the embodiments of FIGS. 1-10 and 11-16, the second pivot element 5 is for example obtained in a manner per se conventional, with a metal body provided with three parallel shoulders 5A, 5B, 5C, fixed to a common base 12 from which, for example, one or more feet 13 are extended that are embedded in the plastic matrix of the end piece 3 of the eyeglasses in accordance with the embodiment of FIGS. 1-10.

Otherwise, without departing from the protective scope of the present patent, the second pivot element 5 can be integrally obtained, still in a manner that is per se entirely conventional, in the plastic material of the end piece 3 with the three parallel shoulders 5A, 5B 5C integrally made in the plastic of the end piece 3.

Otherwise, furthermore, in case of metal eyeglasses, the second pivot element 5 can be made of a metal body welded to the end piece 3 of the frame in accordance with the embodiment of FIGS. 11-16.

The three shoulders 5A, 5B, 5C of the second pivot element 5 are provided with corresponding second holes 50A, 50B, 50C and are parallel to each other and equidistant so as to delimit therebetween two corresponding slits 14 in which the head portions 9A, 9B are inserted. More in detail, advantageously, the three shoulders 5A, 5B, 5C of the second pivot element 5 comprise, a first shoulder 5A, provided with a second shaped through hole 50A with a cavity in which the head 60 of the pin 6 preferably fits; a second shoulder 5B, provided with a second central threaded hole 50B; and a third shoulder 5C having a second hole 50C advantageously with diameter smaller than or equal to the other two 50A, 50B.

In accordance with the embodiment of FIGS. 17-20, in which as stated the first pivot element 4 provided with the two head portions 9A, 9B is associated with the end piece 3 and the second pivot element 5 with the three shoulders 5A, 5B, 5C is associated with the temple 2, the elastic device 7 formed by one or more carts 8 in the preceding solutions is now substituted by an elastic device formed by one or more elastic pushers 8', which act—pushed by the spring 11—against the shaped profile of the head portions 9A, 9B.

For such purpose, the pushers 8' comprise a piston 80 with an enlarged head 81 associated at one end thereof, such head acting as abutment for a spring 11, wound around its axis and compressed within the containment structure 10, or a ball (not illustrated since well known to the man skilled in the art) pushed in abutment by a spring 11 still housed within the containment structure 10.

The enlarged head 81 (or the ball) act against the cam profile of the head portions 9A, 9B of the first pivot element 4 integral with the end piece 3 of the front of the eyeglasses.

The elastic device 7 formed by one or more elastic pushers 8' and by the spring 11 is still contained in the containment structure 10 but in this case the spring 11 is adapted to push the pusher 8' towards the exterior of the containment structure 10.

The second pivot element 5 is provided in the embodiment of the FIGS. 17-20 fixed to the temple and is obtained, for example in a manner that is per se entirely conventional, once again with three parallel shoulders 5A, 5B, 5C, advantageously integrally made with the temple.

Exactly as in the preceding cases, advantageously, the three shoulders 5A, 5B, 5C of the second pivot element 5 comprise: a first shoulder 5A, provided with a second shaped through hole 50A with a cavity in which the head 60 of the pin 6 fits; a second shoulder 5B, provided with a second threaded central hole 50B and a third shoulder 5C having a second hole 50C advantageously with diameter smaller than or equal to the other two 50A, 50B.

Differently from the preceding embodiments, the containment structures 10 of the elastic devices 7—even if always associated with the temples 3—are in this embodiment associated with the second pivot elements 5 and are advantageously obtained with blind seats having longitudinal extension Y and made between one shoulder and the next 5A, 5B, 5C in continuation of the slits 14.

The head 81 of the piston 80 or the ball of the elastic pusher 8' act against the cam profile provided on the two head portions 9A, 9B of the first pivot element 4 being pushed by such profile inside the corresponding containment structures 10 against the action of the spring 11. Unlike the elastic devices 7 with cart 8 of the preceding embodiments, which during the rotation of the temple 2 are extracted from the relative containment structure 10 against the action of the spring 11, in accordance with the present embodiment the piston 80 or the ball are pushed inside the containment structure 10 by the cam of the head portions 9A, 9B associated with the first pivot element 4, fixed to the piece 3 of the front, in a manner so as to compress the spring 11 which by reaction will tend to push the piston 80 or the ball outside against the aforesaid cam profile.

As seen in the enclosed FIGS. 17-20 and as is already per se known to a man skilled in the art, the cam profile of the head portions 9A, 9B determines the open position, closure position and extra-open position of the temples.

In accordance with the present invention and with all the embodiments presented above, the elastic device 7 slidably movable along the longitudinal axis Y of the containment structure 10 provides that the at least one spring 11 acts against the head portions 9A, 9B, transmitting an elastic action thereto. And this in the case in which the head portions 9A, 9B are part of the carts 8 and hence of the same elastic device 7 (first two embodiments of FIGS. 1-10, 11-16), and in the case of the embodiment of FIGS. 17-20, in which the head portions 9A, 9B are outside the elastic device 7 since they are associated with the pivot element opposite that associated with the elastic device 7.

According to the idea underlying the present invention, the hinge pin 6 comprises a head 60 and a stem 61 provided with a first end 62, connected to the head 60, and with a second free end 63 opposite the first end 62 connected to the head 60. The stem 61 is provided with a threaded portion 61A and with a thinned portion 61B positioned in continuation of the threaded portion 61A towards the free end 63.

The thinned portion 61B has a smaller diameter than that of the threaded portion 61A. The free end 63 of the pin 6 is contained inside the second hole 50C of the corresponding third shoulder 5C of the second pivot 5, having a diameter advantageously reduced or at most equal to the other two holes 50A, 50B of the remaining first and second shoulder 5A, 5B.

The thinned portion 61B carries out the function, during mounting of the pin 6, of drawing the elastic device 7 outside the containment structure 10, whether such device is formed by one or more carts 8 or pushers 8', so as to eliminate an initial misalignment D between the first holes 4A, 4B of the first pivot element 4 and the second holes 50A, 50B, 50C of the shoulders 5A, 5B, 5C of the second pivot element 5 and allow the complete insertion of the pin 6 without jamming due to misalignment.

More in detail, while (as mentioned above) the first shoulder 5A is provided with a shaped through hole 50A defining a cavity in which the head 60 of the pin 6 fits, the threaded central through hole 50B of the second shoulder 5B is engaged via screwing with the threaded portion 61A of the stem 61 of the pin 6, and the second hole (advantageously with reduced diameter) 50C of the third shoulder 5C houses the thinned portion 61B of the pin 6 at its interior.

Preferably, the thinned portion 61B of the pin 6 and the second hole 50C of the third shoulder 5C lack threading and substantially have the same diameter, compatibly with the need to insert the portion 61B in the hole 50C.

Advantageously, the aforesaid thinned portion 61B in turn consists of a central portion 61B' and with two end portions, i.e.: a terminal portion 61B", with tapered shape and in particular frustoconical towards the free end 63 so as to attain a first opening for the insertion of the pin 6; of a connecting portion 61B'", which also preferably has a frustoconical shape and acts as a connection between the aforesaid central portion 61B' and the threaded portion 61A so as to make a second opening for the insertion of the pin 6.

The terminal portion 61B" and the connecting portion 61B'" of the thinned portion 61B are each advantageously adapted to interfere with a head portion 9A, 9B of the elastic device 7 and, if the latter is obtained with two separate carts 8, then each will determine an independent movement acting against the head portions 9A, 9B during the insertion of the pin 6, first the connecting portion 61B'" and then the terminal portion 61B":

Preferably, the stem 61 of the pin 6 is further provided with an initial non threaded portion 64 starting from the head 60 and placed to connect with the threaded portion 61A of the same stem 61.

Figure 23A:
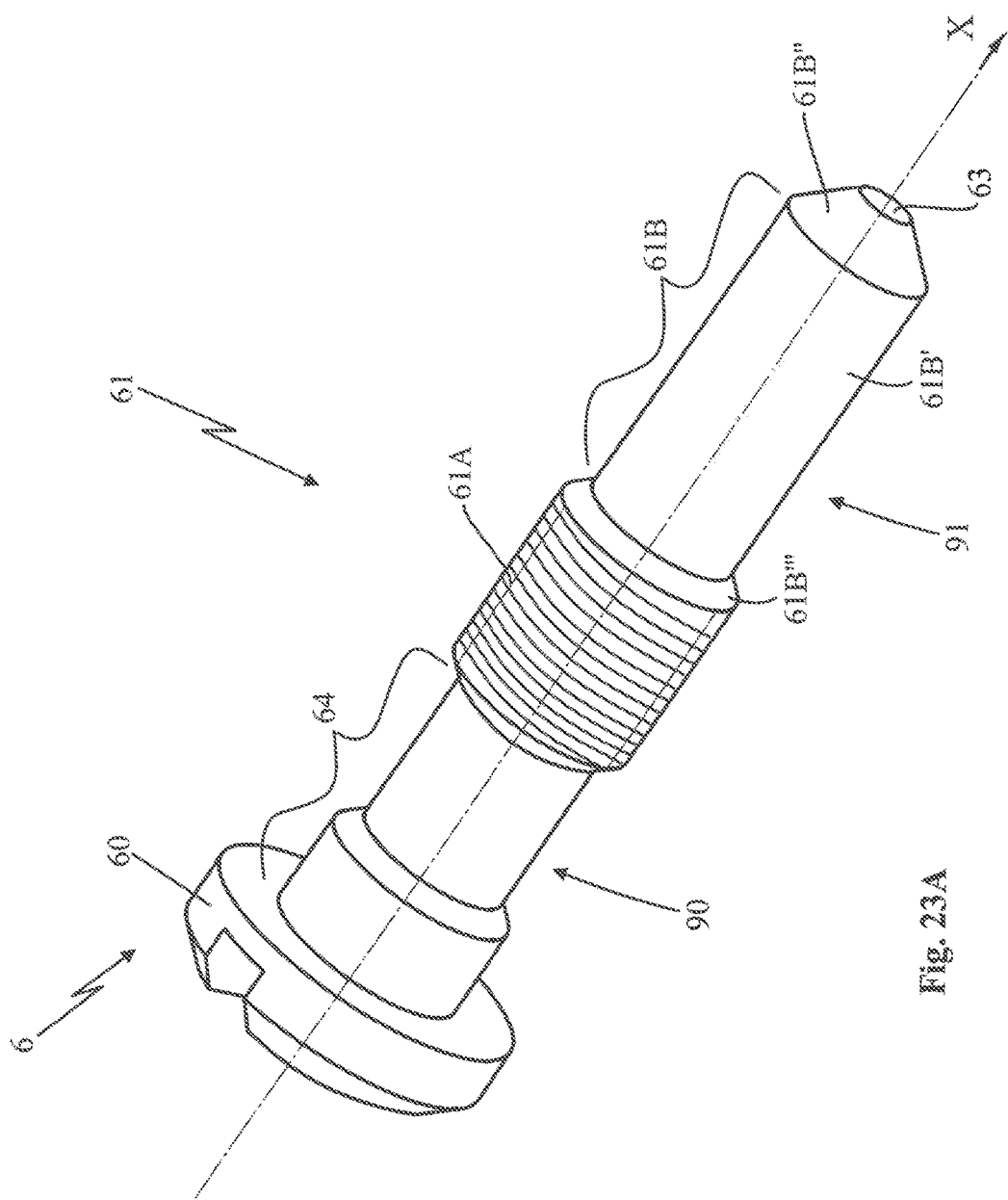
FIG. 23A shows in a perspective view a detail of the elastic hinge relative to the connection pin of the pivots in accordance with an embodiment variant.
Figure 23B:
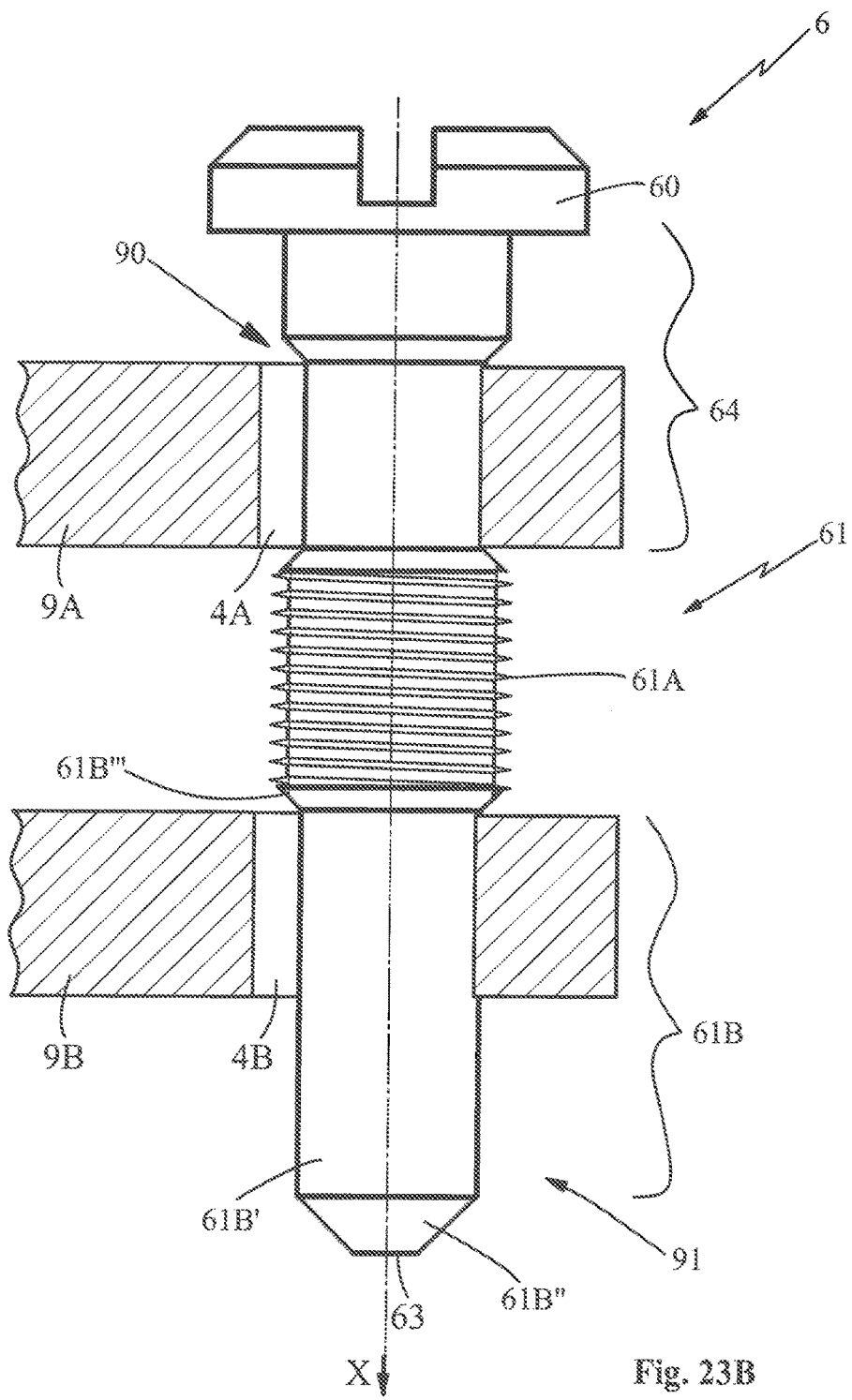
FIG. 23B shows the pin of FIG. 23A in a side view with some parts of the first hinge pivot relative to the head portions associated therewith.

In accordance with an embodiment variant of the hinge pin 6 illustrated in FIGS. 23A and 23B, the initial non-threaded portion 64 comprises a first annular depression 90 with reduced diameter with respect to the threaded portion 61A. Such first annular depression 90 is extended for at least the extension of the facing and corresponding first head portion 9A of the two provided head portions 9A, 9B. In this manner, the first head portion 9A is inserted in the first annular depression 90 which remains defined between the head 60 and the threaded portion 61A. The engagement of the head portion 9A in such first annular depression 90 obstructs the unscrewing of the hinge pin 6.

Advantageously, the central portion 61B' of the aforesaid thinned portion 61B also comprises a second annular depression 91 with reduced diameter with respect to the threaded portion 61A. Such second annular depression 91 is in turn extended at least for the extension of the other corresponding and facing second head portion 9B so as to allow the latter to be inserted in the second annular depression 91. In accordance with the embodiment of the aforesaid enclosed figures, such second depression 91 coincides with the central portion 61B' of the aforesaid thinned portion 61B and is thus delimited between the threaded portion 61A and the free end 63 of the pin 6.

In accordance with the embodiments of FIGS. 1-16, the elastic return of the two carts 8 ensures that once the pin 6 is inserted between the two pivot elements 4, 5, the internal surface of the two holes 4A, 4B of the head portions 9A, 9B are pulled into contact on one side against the two depressions 90, 91, determining a misalignment of the same holes 4A, 4B with respect to the axis X of the pin 6.

The engagement of the internal surfaces of the holes 4A, 4B in the aforesaid depressions 90, 91 produces an anti-unscrewing effect of the pin 6.

Advantageously, the first holes 4A, 4B of the head portions 9A, 9B of the first pivot 4 are flared at least in the direction of insertion of the pin 6 so that the aforesaid terminal portion 61B" and connecting portion 61B''' of the thinned portion 61B of the pin 6 interfere without jamming against the elastic device 7, so as to move it outside the containment structure 10, further preloading it and aligning the holes 4A, 4B, 50A, 50B, 50C of the two pivots 4, 5 for the complete insertion of the pin 6.

As stated above, the pin 6 must remain complete contained (at least in its second end 63) within the holes of the pivots 4, 5 and for such purpose its second free end 63 remains contained inside the second hole 50C of the corresponding third shoulder 5C of the second pivot 5. In this manner, it is possible to obstruct the second hole 50C on the visible external face of the third shoulder 5C by extending the material of the temple with a closure portion to cover such second hole 50C, as illustrated in the embodiment of FIGS. 1-10, or by making such second hole 50C blind, as illustrated in the embodiment of FIGS. 11-16.

The concept underlying the present invention is therefore not only limited to solutions of elastic hinges 1 with elastic devices 7 composed of two or more carts 8, but can be analogously effective also on elastic hinges 1 with elastic devices 7 composed of elastic pushers 8', otherwise termed "ball-spring" or "piston-spring" mechanisms, in which the hinge axis is fixed and the elastic release in opening/closing and in extra-opening is determined by one or more pistons (or pads, or balls) coupled with springs 11 inserted in the containment structures 10 obtained in the temple 2 or in the end piece 3.

Also in this type of elastic hinges (see FIGS. 17-20), it is in fact necessary for the elastic device to be preloaded. Therefore, also in this case, when the two hinge elements 4, 5 are approached during mounting, the presence of the two pistons 80 in abutment against the cam of the two head portions 9A, 9B of the first pivot element 4 causes misalignment D, considered above for the embodiments with elastic device 7 with carts 8 (described above). Also in the embodiment of FIGS. 17-20, in order to screw the hinge pin 6 it is necessary for the holes of the two pivot elements 4, 5 to be aligned with each other, overcoming the elastic reaction force of the springs 11.

Forming the object of the present invention is a process for mounting a hinge 1 on eyeglass frames, in particular of the above-described type, with regard to which the same reference numbers will be maintained hereinbelow. Hence, for exposition simplicity, reference will be made to the same nomenclature introduced up to now, even if it must be intended that the present process can also be employed for mounting hinges that are different from those considered above.

The aforesaid process provides for the following operational steps.

Fixing steps are provided that are per se entirely conventional and for this reason are not described in detail since they are well known to a man skilled in the art. Such steps involve fixing the first pivot element 4 to a corresponding first component of the frame (e.g. a temple 2), in a manner such that the aforesaid at least two head portions 9A, 9B are extended at least partially outside the containment structure 10, and fixing the second pivot element 5 to a corresponding second component of the frame (e.g. to the end piece 3).

A step follows in which the two pivot elements 4, 5 are approaching, moving the temple 2 and the front 3 closer to each other; then there is a step of inserting the two head portions 9A, 9B in the two slits 14 defined by the three shoulders 5A, 5B, 5C in order to put the first holes 4A, 4B and the second holes 50A, 50B, 50C in succession even if a misalignment D remains between the aforesaid first and second holes aimed to determine a further load of the spring 11 of the elastic device 7. According to the idea underlying the invention of the aforesaid process, a step is also provided for engaging the pin 6 inside the first and second holes of the two pivots 4, 5, and during such step the thinned portion 61B of the pin 6 interferes with the head portions 9A, 9B, forcing the elastic device 7 to slide within the containment structure 10 until the first holes 4A, 4B of the head portions 9A, 9B of the first pivot 4 are substantially aligned with the second holes 50A, 50B, 50C of the shoulders 5A, 5B, 5C of the second pivot 5.

At the end of the step of engagement of the pin 6, the free end 63 of its thinned portion 61B remains contained inside the second hole 50C of the corresponding third shoulder 5C of the second pivot 5.

More in detail, with reference to the sequence of steps indicated in FIGS. 10A-10D, the thinned portion 61B suitably has, at least at the second free end 63, a diameter smaller or equal to the diameter of the circle inscribable in the overlapping section of the first holes 4A, 4B and the second holes 50A, 50B, 50C (represented by the oblique background in FIG. 9). In this manner (see FIGS. 10A and 10B), the thinned portion 61B will have no problems in fitting into the hole 50A of the shoulder 5A of the second pivot element 5 and into the hole 4A of the head portion 9A of the cart 8, even if said holes are offset from each other. Advantageously, the tapered portion 61B" will further facilitate this first jamming step.

Continuing in the steps of engagement of the hinge pin 6 in the two pivot elements 4, 5 (FIG. 10C), a first movement of the head portion 9A of the first pivot 4 is determined following the interference against it, first of the tapered portion 61B" and subsequently of the central portion 61B' and connection portion 61B'''of the thinned portion 61B of the pin 6. The same movement will occur for the other head portion 9B of the first pivot 4.

The engagement of the screw in the elastic hinge 1 will be complete (FIG. 10D) when the head 60 of the screw 6 will be housed in the flaring obtained in the hole 50A: at this point, the threaded portion 61A is screwed on the threaded central hole 50B of the second shoulder 5B and simultaneously the thinned portion 61B is housed at least in its terminal part in the second hole 50C of the third shoulder 5C.

The process thus conceived therefore attains the preestablished objects and in particular allows mounting an elastic hinge in a facilitated and non-costly manner, and simultaneously allows avoiding unaesthetic elements due to visible parts of the hinge.

In any case, it is clear that the elastic hinge described up to now can be modified, without departing from the scope of the invention. For example, nothing prevents the pivot element that comprises the elastic device from being arranged on the end piece of the eyeglasses rather than on the temple.

The invention claimed is:

1. Process for mounting an elastic hinge on eyeglass frames, such elastic hinge comprising:
    at least one first pivot element provided with at least two protruding head portions and provided with two corresponding first holes having a first common axis;
    at least one second pivot element comprising at least three shoulders which are provided with corresponding second holes having a second common axis, and delimit therebetween two slits in which said head portions are inserted;
    a containment structure elongated along a longitudinal axis (Y), housing an elastic device slidably which is movable along said longitudinal axis (Y), is mechanically associated with said first pivot element or said second pivot element, and acts against said head portions transmitting an elastic action on said head portions;
    at least one hinge pin that is engaged in the first holes of said first pivot element and in the second holes of said second pivot element in order to rotatably couple together said first pivot element and said second pivot element about a transverse axis (X) parallel to said first common axis and said second common axis; said hinge pin having a head and a stem, such stem is provided with a first end connected to said head and with a second free end opposite said head; said stem being provided with at least one threaded portion, and with at least one thinned portion positioned in continuation of said threaded portion towards said second free end and having smaller diameter compared to a maximum diameter of said threaded portion;
said process comprising the following operational steps:
    fixing said first pivot element to a first component of an eyeglass frame;
    fixing said second pivot element to a second component of the eyeglass frame;
    associating said elastic device with said first pivot element or said second pivot element, so that said elastic device acts against said head portions transmitting an elastic action on said head portions along said longitudinal axis (Y);
    inserting said at least two head portions in the two slits defined between said three shoulders in order to put said first holes and said second holes in succession, wherein the first common axis of the first holes of said head portions is parallel to the second common axis of the second holes of said three shoulders, and is offset by a misalignment distance (D) from the second common axis of the second holes of said three shoulders;
    engaging said hinge pin in the first holes of said first pivot element and in the second holes of said second pivot element, wherein the thinned portion of said hinge pin interferes with said head portions and acts against the elastic action of said elastic device, forcing said elastic device to slide within said containment structure until the first holes of the head portions of said first pivot element are substantially aligned with the second holes of the shoulders of said second pivot element;
    the free end of said thinned portion remaining contained inside the second hole of the corresponding shoulder of said second pivot.

2. Process according to claim 1, wherein said thinned portion of said hinge pin comprises a tapered terminal portion, and a connecting portion which connects said thinned portion with the threaded portion of said hinge pin;
    wherein engaging said hinge pin in said first holes and second holes comprises:
        the connecting portion of said thinned portion of said hinge pin interferes with a first head portion of the head portions, causing a first movement of said first head portion along said longitudinal axis (Y),
        and, then, the tapered terminal portion of said thinned portion of said hinge pin interferes with a second head portion of the head portions of said first pivot element, causing a subsequent second movement of said second head portion along said longitudinal axis (Y).

3. Process according to claim 1, wherein during the engaging of said hinge pin in said first holes and in said second holes:
    the head of said hinge pin is housed in a shaped second hole of a first shoulder of the shoulders of said second pivot,
    the threaded portion of the stem of said hinge pin is engaged via screwing in a central threaded second hole of a second shoulder of the shoulders of said second pivot,
    at least one terminal portion of the thinned portion of said hinge pin is inserted in the second hole of a third shoulder of the shoulders of said second pivot.

4. Process according to claim 1, wherein the thinned portion of said hinge pin has, at least at said second free end, a diameter smaller or equal to a diameter of a circle inscribable in an overlapping section of said first holes and said second holes when said first common axis is offset by said second common axis.

5. Process according to claim 1, wherein, during the engaging of said hinge pin in said first holes and second holes, said thinned portion (61B) is set inside said first holes and second holes by means of a terminal portion of said thinned portion, such terminal portion tapered towards said second free end.

6. Process according to claim 1, wherein, during the engaging of said hinge pin in said first holes and second holes, said thinned portion interferes with at least one of the head portions by means of a connecting portion of said thinned portion, such connecting portion having frustoconical shape.

7. Process according to claim 1, wherein the three shoulders of said second pivot element comprise:
    a first shoulder provided with a corresponding second through hole;
    a second shoulder provided with a corresponding second central threaded through hole;
    and a third shoulder provided with a corresponding second hole;
    wherein, during the engaging of said hinge pin in said first holes and second holes, the threaded portion of the stem of said hinge pin is engaged via screwing in the second central threaded through hole of said second shoulder.

8. Process according to claim 1, wherein the three shoulders of said second pivot element comprise:
- a first shoulder provided with a corresponding second shaped through hole;
- a second shoulder provided with a corresponding second threaded central through hole;
- and a third shoulder provided with a corresponding second hole; wherein, during the engaging said hinge pin in said first holes and second holes, the head of said hinge pin is inserted in the shaped through second hole of said first shoulder.

9. Process according to claim 1, wherein the three shoulders of said second pivot element comprise:
- a first shoulder provided with a corresponding second through hole;
- a second shoulder provided with a corresponding second central threaded through hole;
- and a third shoulder provided with a corresponding second hole; wherein, during the engaging of said hinge pin in said first holes and second holes, at least one terminal part of the thinned portion of said hinge pin is inserted in the second hole of said third shoulder.

10. Process according to claim 1, wherein the first holes of the head portions of said first pivot element are beveled at least in the direction of inserting said hinge pin to form corresponding countersinks;
- wherein, during the engaging of said hinge pin in said first holes and second holes, the thinned portion of said hinge pin interferes against the countersink of at least one of said first holes so as to move said elastic device towards the exterior of said containment structure, aligning the first holes of the first pivot element with the second holes of the second pivot element.

11. Process according to claim 1, wherein the three shoulders of said second pivot element comprise:
- a first shoulder provided with a corresponding second through hole;
- a second shoulder provided with a corresponding second central threaded through hole;
- and a third shoulder provided with a corresponding blind second hole;
- wherein, during the engaging of said hinge pin in said first holes and second holes, at least one terminal part of the thinned portion of said hinge pin is inserted in the blind second hole of said third shoulder.

12. Process according to claim 1, wherein:
- said first pivot element is mechanically associated with a temple of the eyeglass frame;
- said second pivot element is mechanically associated with a front of the eyeglass frame;
- said containment structure is fixed to said temple;
- wherein said elastic device comprises one or more carts bearing said head portions mechanically associated thereto.

13. Process according to claim 1, wherein said threaded portion is connected to the head a said hinge pin with the interposition of an initial non-threaded portion.

14. Process according to claim 13, wherein the initial non-threaded portion of said hinge pin comprises a first annular depression with reduced diameter compared to the threaded portion,
- wherein, during the engaging of said hinge pin in said first holes and second holes, a first facing head portion of said head portions is inserted in the first annular depression in order to prevent the unscrewing of said hinge pin.

15. Process according to claim 13, wherein the thinned portion of said hinge pin is provided with a central portion which comprises a second annular depression with reduced diameter compared to the threaded portion,
- wherein, during the engaging of said hinge pin in said first holes and second holes, a second facing head portion of said head portions is inserted in the annular depression in order to prevent the unscrewing of said hinge pin.

* * * * *